(12) United States Patent
Dickey

(10) Patent No.: US 6,856,994 B2
(45) Date of Patent: Feb. 15, 2005

(54) SYSTEM AND METHOD FOR CONDENSING APPLICATION SOFTWARE

(75) Inventor: Laura J. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 462 days.

(21) Appl. No.: 10/160,800

(22) Filed: May 30, 2002

(65) Prior Publication Data

US 2003/0225776 A1 Dec. 4, 2003

(51) Int. Cl.$^7$ .............................................. G06F 17/30
(52) U.S. Cl. ........................ 707/101; 707/2; 707/100; 707/200; 717/106
(58) Field of Search ......................... 707/2, 100, 101, 707/200; 717/103, 106, 110, 122, 169

(56) References Cited

U.S. PATENT DOCUMENTS

| | | | |
|---|---|---|---|
| 5,572,206 A | 11/1996 | Miller et al. ................... 341/51 |
| 5,857,197 A | 1/1999 | Mullins .................. 707/103 R |
| 5,907,707 A | 5/1999 | Ramalingam et al. ...... 717/104 |
| 5,920,729 A | 7/1999 | Barnett ......................... 326/64 |
| 5,999,949 A | 12/1999 | Crandall ...................... 715/532 |
| 6,163,780 A | * 12/2000 | Ross .......................... 707/101 |
| 6,634,022 B1 | * 10/2003 | Leermakers ................. 717/158 |
| 6,732,108 B2 | * 5/2004 | Factor et al. ................ 707/100 |
| 2003/0163505 A1 | * 8/2003 | Dmitriev |

FOREIGN PATENT DOCUMENTS

WO     WO 99/51039 A2 * 10/1999

* cited by examiner

Primary Examiner—Greta Robinson
Assistant Examiner—Cheryl Lewis (57) ABSTRACT

A method is disclosed for condensing an executable computer code for execution on a virtual machine. The method comprises condensing a first computer code of a plurality of system classes into a base file and condensing an application file. Condensing the first computer code is performed in a data processing environment external of the virtual machine. Condensing the application file is performed in a data processing environment external of the virtual machine and includes replacing each occurrence of one of the system classes in the application file with an external index reference to a respective system class in the condensed base file.

19 Claims, 7 Drawing Sheets

SYSTEM AND METHOD FOR CONDENSING APPLICATION SOFTWARE

THE FIELD OF THE INVENTION

The present invention relates to software code and in particular to condensing software code.

BACKGROUND OF THE INVENTION

Since the dawn of the computer age, there has been a continual drive for achieving greater computing power and memory in less space. Recently, this scene has been played out with portable or mobile computing devices, such as personal digital assistants (PDA). With the increasing ability to place greater amounts of memory in the mobile computing devices, software vendors have been working hard to offer the same applications in smaller versions, usually with less features, to accommodate the smaller memory available in the mobile computing devices. In addition, newer programming languages, such as the JAVA programming language, are used to allow software applications to be universally compatible with most operating systems through the use of a virtual machine present on a host device. However, this universality comes at a cost of using lots of memory, which makes miniaturization more challenging.

One recent breakthrough in reducing the memory size of software applications, i.e. their memory footprint, is a technique for condensing a software application. With condensing, the application still retains all of it features but takes up less memory space. One technique for condensing a software code is disclosed in U.S. Pat. No. 6,163,780, "System and Apparatus For Condensing Executable Computer Software Code" and is now commonly known and popularized by Hewlett-Packard, Inc. as the Chai Freeze Dry condensing technique. Using condensed software applications allows a greater number of, or greater sized, software applications to be installed in mobile computing devices. Alternatively, the same number of software applications can be installed in less memory space in the mobile computing devices, thus enabling the mobile computing devices to become smaller and/or less expensive.

Figure 1:
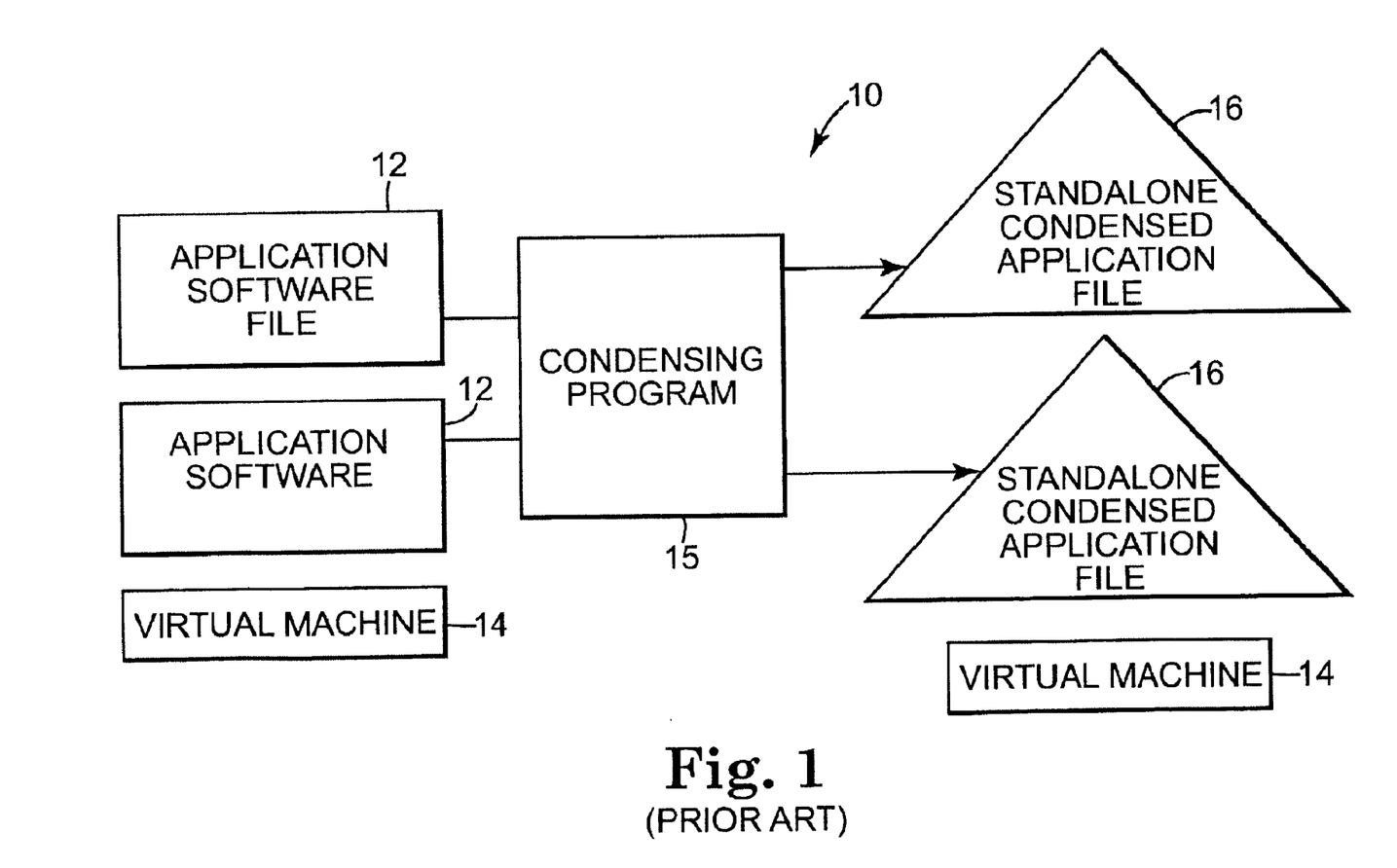
FIG. 1 is a block diagram of a prior art software condensing system.

One prior art example is shown in FIG. 1, which illustrates system 10 for condensing application software files. As shown in FIG. 1, system 10 includes a plurality of application software files 12, virtual machine 14, condensing program 15, and standalone condensed application files 16. Application software files 12 are conventional software programs, such as those written in the JAVA programming language. Condensing program 15 is a software program for condensing application software files 12 and preferably employs the condensing algorithms disclosed in U.S. Pat. No. 6,162,780. Standalone condensed application files 16 produced by condensing program 15 are closed files which can operate on any virtual machine 14, making them portable and not dependent on other files for operation. As previously discussed, these standalone condensed application files 16 take up less memory footprint for a device on which they are installed.

Despite these advances, newer software applications continue to demand more memory, and users demand more and more applications for mobile computing devices. Accordingly, there is a continuing drive for improvement to reduce the memory space required to store and execute a software application on a mobile computing device.

SUMMARY OF THE INVENTION

A method of the present invention is disclosed for condensing an executable computer code for execution on a virtual machine. The method comprises condensing a first computer code of a plurality of system classes into a base file and condensing an application file. Condensing the first computer code is performed in a data processing environment external of the virtual machine. Condensing the application file is performed in a data processing environment external of the virtual machine and includes replacing each occurrence of one of the system classes in the application file with an external index reference to a respective system class in the condensed base file.

BRIEF DESCRIPTION OF THE DRAWINGS

Throughout the drawings, identical reference numerals refer to identical elements.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

A system and method of the present invention provides an enhanced way of condensing application software for multi-application embedded environments to produce condensed incremental application files. With this system and method, the overall memory footprint occupied by the condensed incremental application files is smaller than with known condensing techniques. Moreover, since the application files are condensed prior to loading by the virtual machine, the startup time including the transmission time of executing and loading the incrementally condensed applications are also faster. With this system and method, any system class, system method, and/or system field (of a library of system classes, methods, and fields), that appears in an application file is removed and replaced with an index reference for that respective system class, system method, and/or system field. The system classes, system methods, and system fields are stored in non-volatile memory in a condensed base file, separate from the application file that includes the replacement index references that correspond to each system class, system methods and system fields. In execution, the condensed application file refers, directly or indirectly, to the condensed base file of system classes, system methods, and system fields each time that an index reference to a system class, system method, and/or system field is encountered in the condensed application file.

Since the condensed base file of system classes, methods and fields includes the full system library of classes, methods, and fields, the same condensed base file can be used with several different condensed incremental application files. Moreover, as the number of condensed incremental application files grows on a device, the system and method of the present invention becomes more efficient since the system classes, methods and fields are not duplicated in the increasing numbers of condensed incremental application files.

In one exemplary embodiment of the present invention, system 50 includes virtual machine 14, condensed base file 52, and a plurality of condensed incremental application files 54. Condensed base file 52 is a file that includes a library of system classes, methods, and fields (e.g. classes, methods, and fields for providing general functions of a programming language) and that have been condensed using the known Chai Freeze Dry condensing algorithms. Condensed incremental application file 54 is a file that includes an application computer code for performing an application task (e.g. word processing, database, etc.) and that has been condensed with the method of the present invention external of a virtual machine for operation with condensed base file 52 on a virtual machine in a target device, as will be more fully described throughout this application.

In combination, condensed base file 52 and a plurality of condensed incremental application files 54 occupy less memory for storage and operation than prior art standalone condensed application files. Each condensed incremental application file 54 interacts with condensed base file 52 to use the system classes, methods, and fields of condensed base file 52. The greater the number of condensed incremental application files 52 are present, the more efficient the system 50 is, as only one set of system classes, methods, and fields can be used any one of many different condensed incremental application files 54. Since condensed base file 52 includes all classes, methods, and fields of a system library, base file 52 can be used with any condensed incremental application file 54 that has been condensed with reference to that base file 52.

Figure 2:
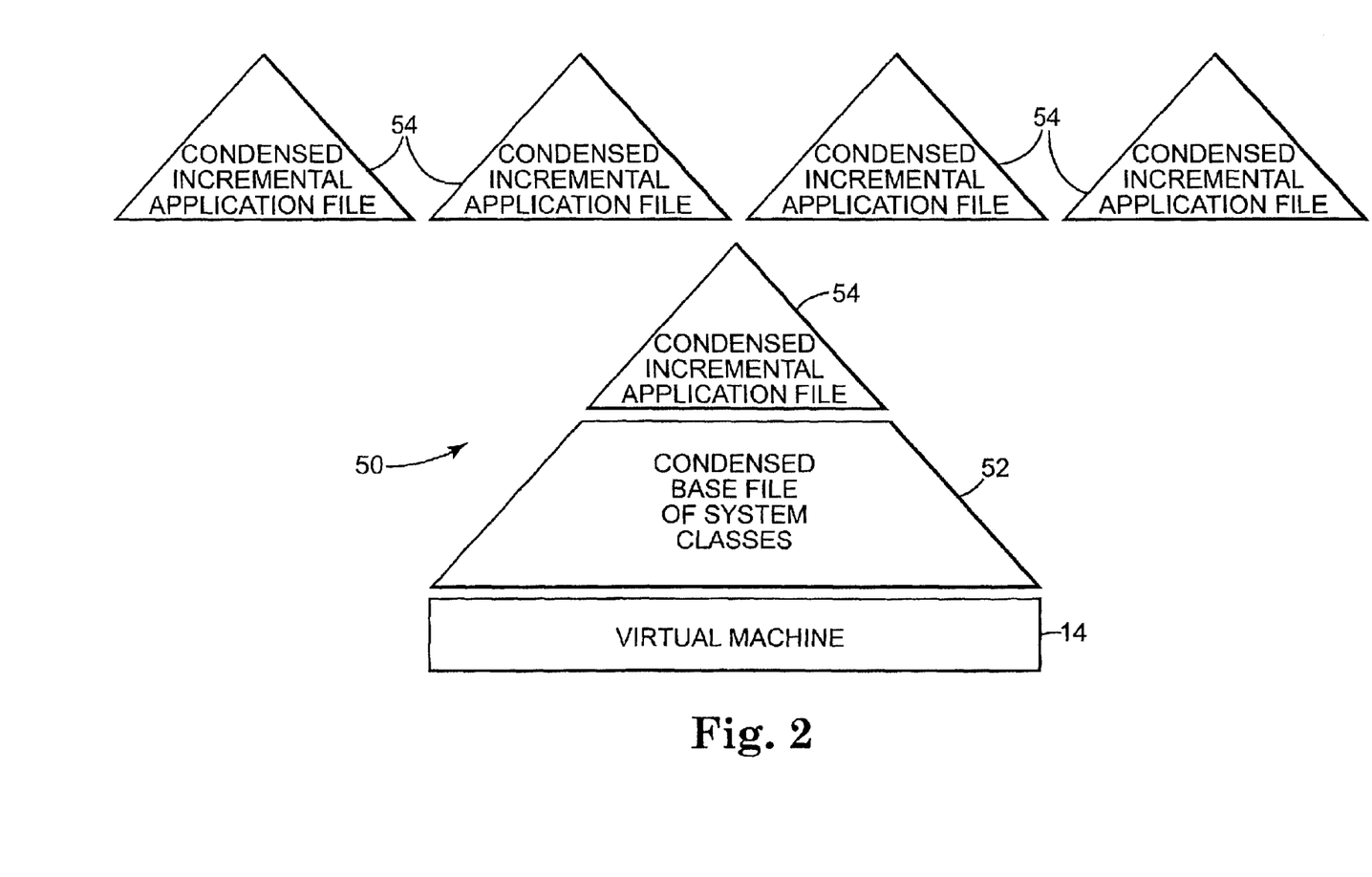
FIG. 2 is block diagram of a system of incremental condensed application files, according to an embodiment of the present invention.

Virtual machine 14 preferably includes the Chai and MicroChai virtual machines available from Hewlett-Packard Company of Palo Alto, Calif. and employs Chai Freeze Dry technology for concentrating application software. This technology is disclosed and claimed in U.S. Patent to Ross, entitled "System and Apparatus For Condensing Executable Software Computer Code", which is hereby incorporated by reference in its entirety. The Chai and/or MicroChai virtual machine is self-contained operating environment that runs on a host computer but behaves as a separate computer or processor within the host computer. The Chai and Micro-Chai virtual machines are particularly adapted to accept and run applications that have been concentrated (i.e. condensed) using Chai Freeze Dry technology.

Figure 3:
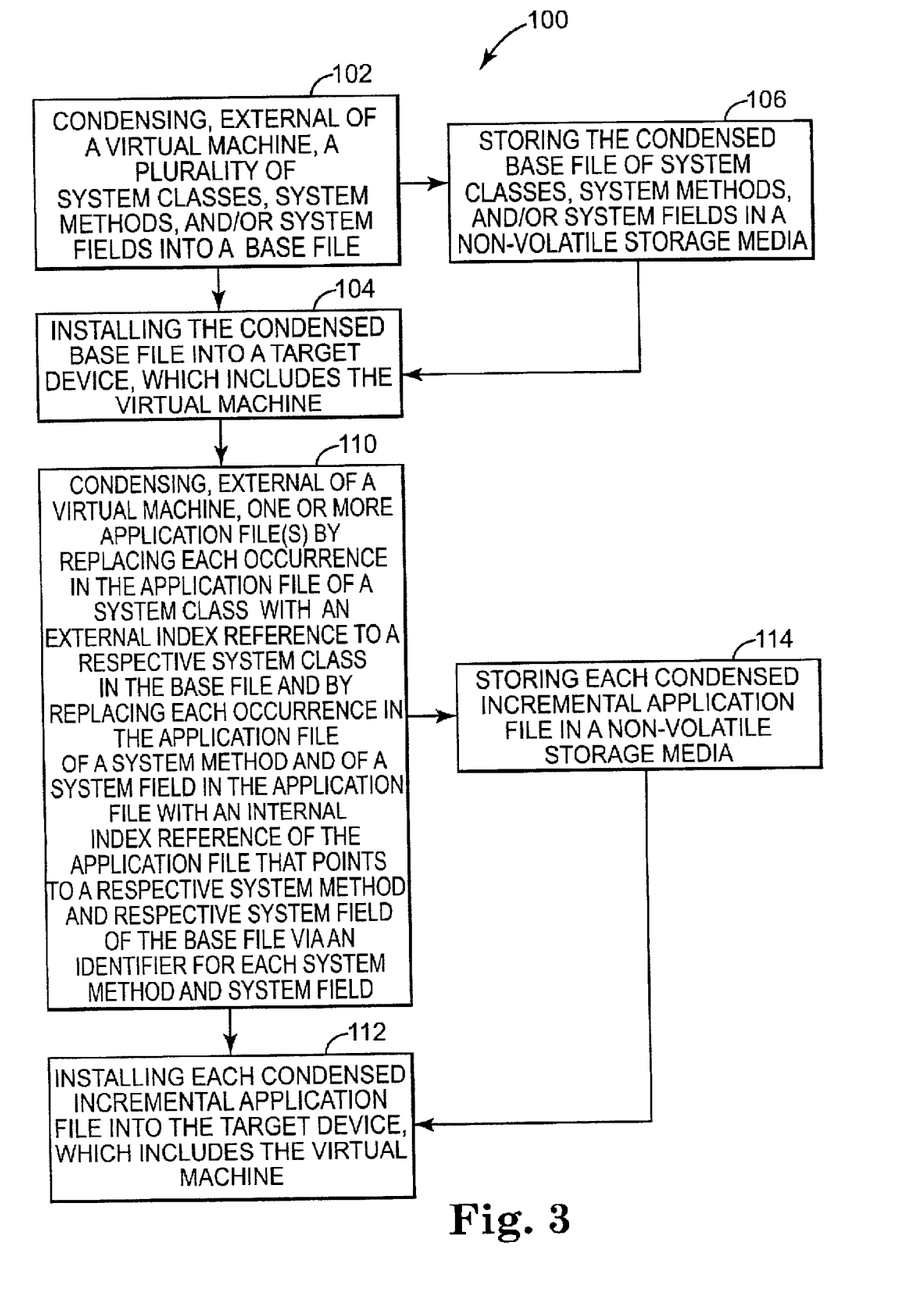
FIG. 3 is a flow diagram of a method of incrementally condensing application files, according to an embodiment of the present invention.

As shown in FIG. 3, method 100 of the present invention includes first step 102 of condensing a plurality of system classes, methods, and/or fields into a base file 52 (FIG. 2) using a condensing algorithm, such as the Chai Freeze Dry condensing algorithm. This step of the method 100 of the present invention is performed external to a virtual machine 14 (FIG. 2) so that the base file is pre-condensed before loading into the virtual machine. This condensing step preferably is performed on a desktop computing environment, although any data processing or computing system for operating a condensing program will work.

Next, in step 104, the condensed base file 52 of system classes, methods and/or fields is installed into a target device for access by the virtual machine 14. The condensed base file 52 preferably is stored in non-volatile memory external to the virtual machine 14.

However, condensed base file 52 need not be installed directly into the target device immediately after step 102. Rather, condensed base file 52 optionally is stored in non-volatile storage media, such as a floppy disk, optical disk, FLASH card, etc. for future use. For example, condensed base file 52 can be copied onto a removable storage media from the non-volatile memory for transporting and/or selling condensed base file 52.

Next, in step 110 of method 100, one or more application files is condensed including replacing each occurrence of a system class, system method, and system field in the application code, with an index reference to a respective system class, system method, system field in the condensed base file 52. Index references for the system classes are external index references that refer directly to the base file 52 while index references for the system methods and system fields are internal index references that refer indirectly to the base file 52 by referring first to an index reference listing within the condensed application file 54. The index reference listing in the condensed application file 54 for each system method and system field includes an identifier configured to refer to the base file.

This condensing step preferably is performed external to the virtual machine 14 so that the application file (and the base file) are pre-concentrated prior to loading and execution on the virtual machine 14. The condensing of step 110 is performed according to the condensing algorithm explained in further detail later in this application in association with FIG. 5. After this condensing step, the application code is treated as a condensed incremental application file 54 with the term "incremental" signifying that the application code is no longer a standalone application file and requires the condensed base file 52 for execution.

In step 112, each condensed incremental application file is installed into the target device. Method 100 also optionally includes step 114 before step 112, in which each condensed incremental application file is stored in non-volatile storage media for later use. In this way, a large number of application files optionally are condensed, stored in memory, and then later installed into a target device.

Figure 4:
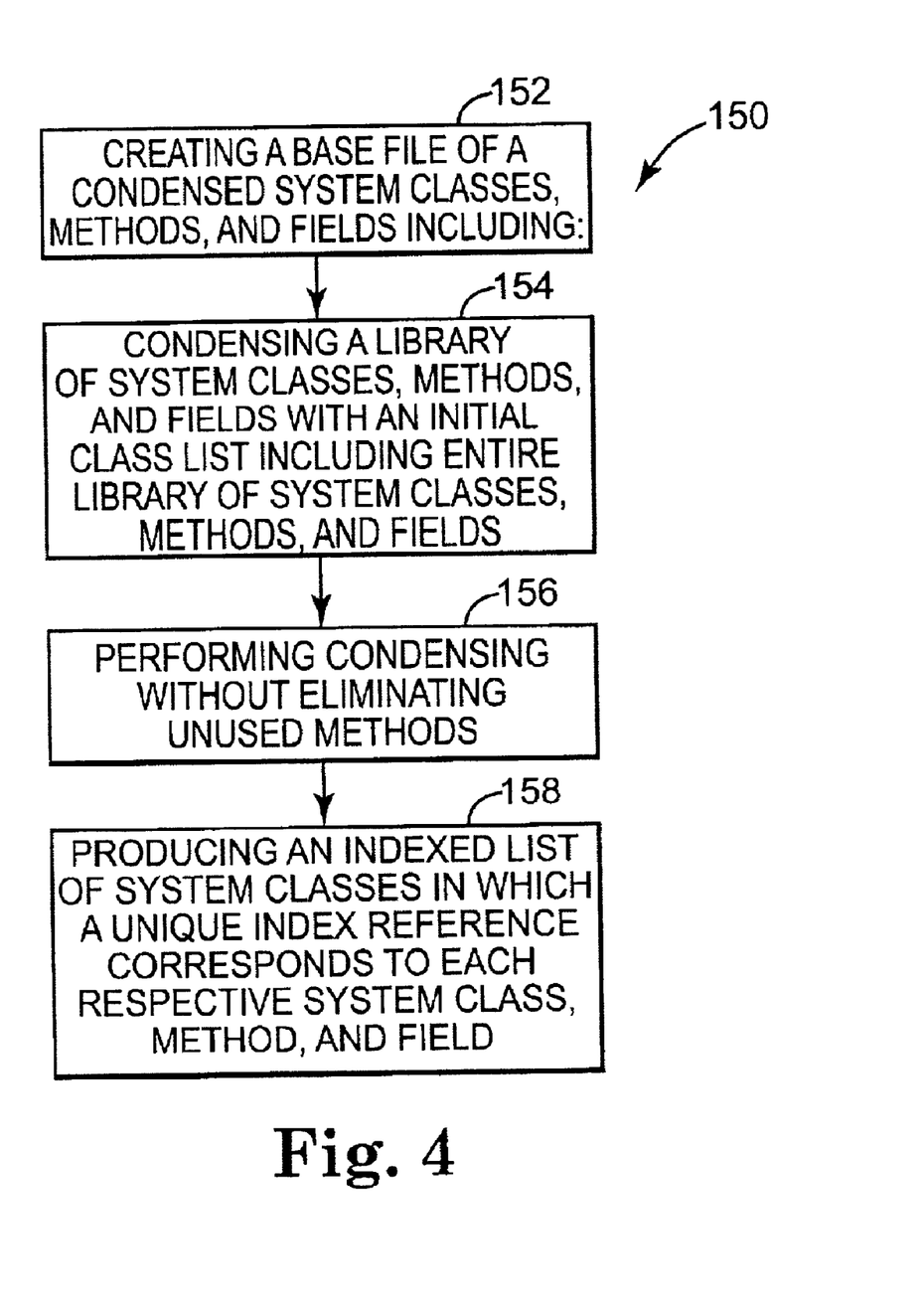
FIG. 4 is a flow diagram of a method of condensing a plurality of system classes, according to an embodiment of the present invention.

Method 150 for condensing a base file of system classes, methods and fields, according to an exemplary embodiment of the present invention, is shown in FIG. 4. Method 150 includes step 152 of creating a base file of condensed system classes including the following steps. First, in step 154, using a condensing algorithm, an entire system library of classes, methods, and fields is condensed. In one example, base file is condensed or concentrated on desktop environment, external to a virtual machine on which the condensed base file will be executed and prior to installation on a target device. The condensing algorithms used are preferably the Chai Freeze Dry condensing algorithms disclosed in previously identified U.S. Pat. No. 6,163,780.

In step 156, the base file is condensed without performing any optimization steps to remove or omit any unused method or classes. Instead, all system classes, methods, and fields are retained for potential future use with condensed incremental application files that would need to call a particular system class, method and/or field.

Next, in step 158, the condensing algorithm produces an indexed list of system class identifiers in which each system class identifier uniquely corresponds to an external index reference. These external index references are to be used by a condensed incremental application file to call the corresponding system classes (and/or system method) located in condensed base file. In step 158, an indexed list of system method identifiers and system field identifiers is also produced with each identifier corresponding to an index reference of each respective system method and each respective system field.

Figure 5:
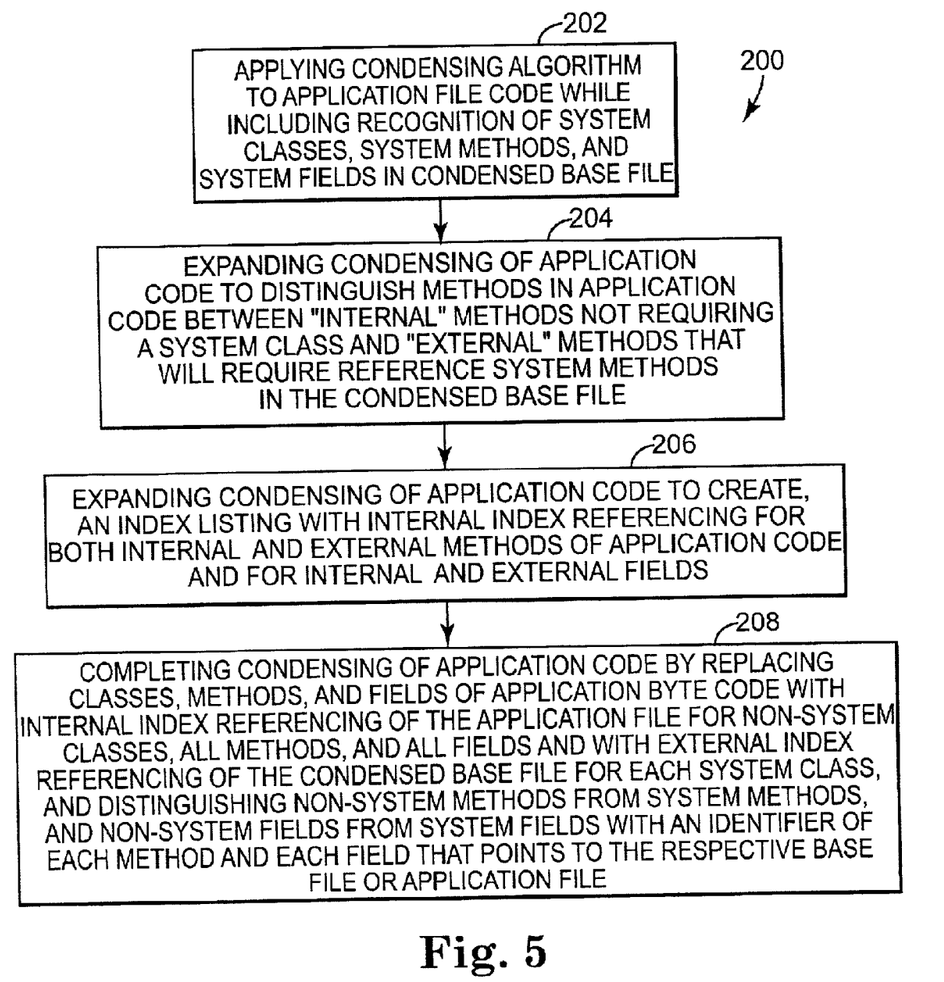
FIG. 5 is a flow diagram of a method of incrementally condensing application files, according to an embodiment of the present invention.

Method 200 of the present invention for condensing an application file is shown in FIG. 5. Method 200 condenses the application file using condensing algorithms in previously identified U.S. Pat. No. 6,163,780 and adds additional criteria and steps to the known condensing algorithm, as identified throughout method 200. This flow diagram of method 200 also serves as an outline and disclosure of a condenser program, according to an embodiment of the present invention, and may be used by one of skill in the art to create such an condenser program according to the present invention.

In its primary form, the known Chai Freeze Dry condensing algorithms involve scanning an entire software code and identifying and listing every unique class, method, and field in the code. A process of iterative, nested scanning is used to insure that every identifier for a class, method, and field is identified and listed. An indexed listing of all of these classes, methods, and fields is created with each unique class, method, and field being assigned an index reference. Next, the code is again scanned and each identifier of a class, method, or field in the code is replaced with its respective index reference from the index listing.

Method 200 adds and/or modifies steps to account for the presence of condensed base file of system classes, methods, and fields and to create a manner in which a condensed incremental application file can interact with the condensed base file. Method 200 also performs the condensing external of a virtual machine on which the condensed application file will be executed and stores the condensed incremental application file in non-volatile memory.

As shown in FIG. 5, step 202 of method 200 includes applying a condensing algorithm to the application software code. Accordingly, the first several steps in condensing an application software code includes scanning the software code and building a list of all classes, methods, fields etc that appear in the software code. This condensing includes condensing application classes, application methods, and application fields (i.e., classes, methods, and fields that are not part of the system classes and system methods) using known condensing algorithms. Accordingly, in addition to identifying all of the application classes, methods, and fields, and all of the system classes, methods, and fields in the application software code, step 202 in method 200 of the present invention includes recognizing all of the system classes, methods, and fields located in condensed base file. These recognized system classes and methods in the condensed base file preferably are categorized as belonging to a base system list and a base method list, respectively. This recognition step is taken with the intention of ultimately removing all system classes, methods, and fields from the application code, to reduce the memory consumed by the application code, and leaving in their place an index reference, directly or indirectly, to the condensed base file, which actually contains the system classes, methods and fields.

In step 204, the known condensing application step of building a list of all methods and fields in the application software code is expanded in method 200 of the present invention to build a list of methods and fields that distinguishes between internal methods, which are methods in the application code that do not invoke a system class, method, or field, and external methods which are methods in the application code that will invoke a system class or system method from the condensed base file.

The condensing of the application software code for methods is again expanded further in step 206 (FIG. 5) to additionally include creating an index listing with an internal index reference, and corresponding unique identifier, for each internal method, internal field, external method, and external field. The identifier for each internal method and internal field (i.e., non-system methods and non-system fields) is configured to point, during execution of the condensed application file, to the condensed incremental application file for calling the internal method or field, when the internal method and/or internal field is invoked by the internal index reference of the condensed incremental application file for the respective internal method or field. The identifier for each external method and external field (i.e., system methods and system fields) is configured to point, during execution of the condensed application file, to the condensed base file for calling the external method or field, when the external method and/or external field is invoked by the internal index reference of the condensed incremental application file for the respective external method or field.

An identifier preferably is a name or header of a class, method, or field sufficient to uniquely identify the respective class, method or field and configured to point to a file (e.g. a condensed base file or condensed application file) that includes the respective class, method or field.

After all of the classes, methods, fields of the application software code have been assigned index references using the known condensing algorithms and known condensing algorithms as modified by the present invention in steps 202–206, then the condensing process is completed in step 208 by replacing classes, methods, and fields in the application code with the assigned index references for each class, method, and field. In particular, all non-system classes, methods, and fields (i.e. application classes and application methods) and system methods and system fields are replaced with internal index references of the application index listing located in the application file. All system classes are replaced with external index references, which correspond to system classes in the system index listing of the condensed base file. The system methods and system fields are distinguished from the non-system methods and fields during execution by their respective identifiers which point either to the condensed base file in the case of system methods and fields or point to the condensed incremental application file in the case of non-system methods and fields.

After updating the application code with bytecode substitution of index referencing in the place of classes, methods, and fields, any additional steps are performed in the known condensing algorithm to prepare the condensed application file for execution. Execution of the bytecode is performed as substantially disclosed in the known Chai Freeze Dry condensing algorithms, except for determining whether to call a method or field from the condensed base file or from the condensed incremental application file.

Figure 6:
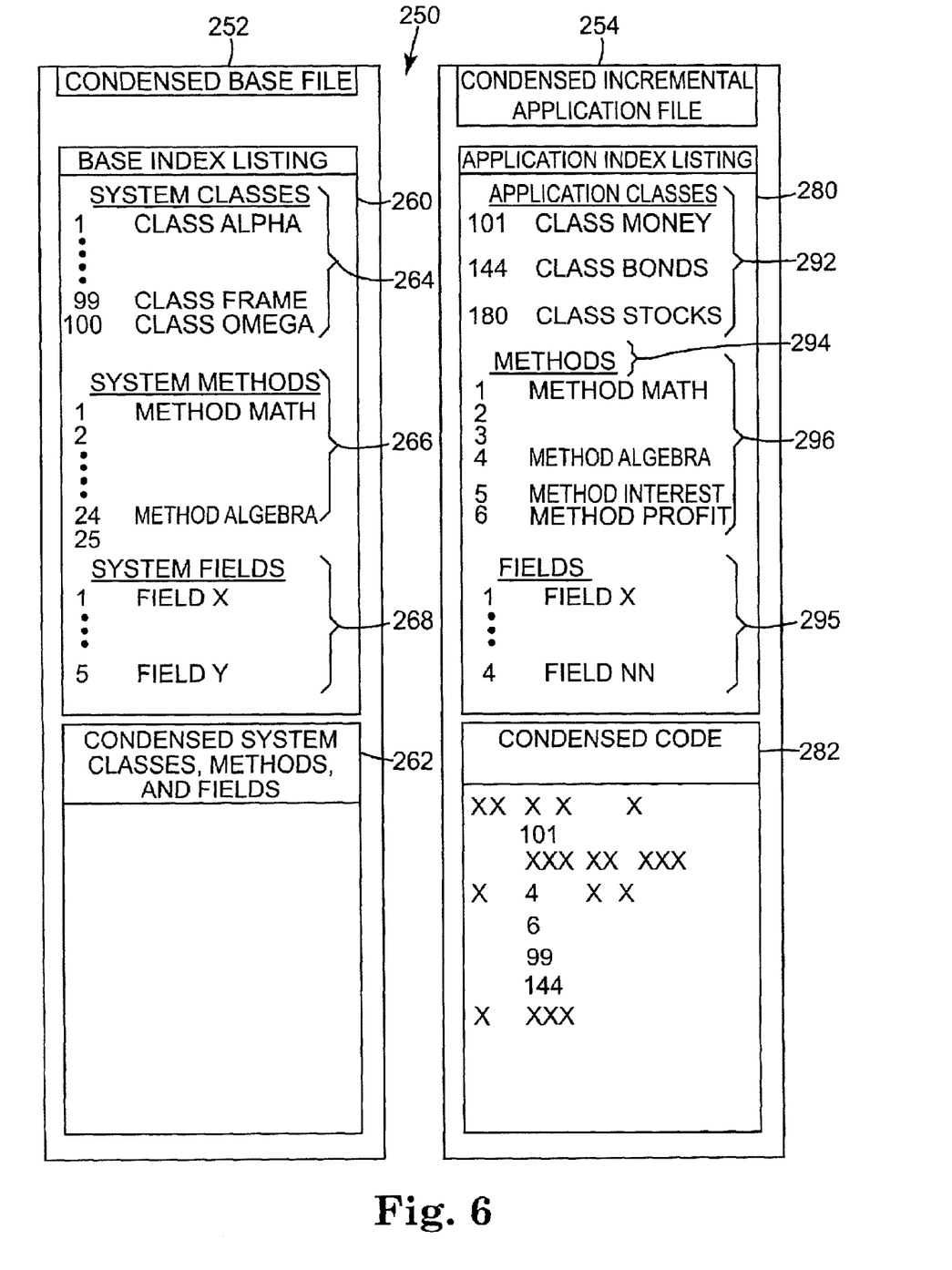
FIG. 6 is block diagram of a condensed base file of system classes and a condensed application file, according to an embodiment of the present invention.

FIG. 6 includes one exemplary embodiment of the present invention of system 250 of files condensed with methods 100 and 200 of the present invention. The condensed files include condensed base file 252 and condensed incremental application file 254. As shown in FIG. 6, condensed base file 252 includes base index listing 260 and condensed library 262 of system classes, methods and fields. Base index listing 260 includes system class index listing 264, system method index listing 266, and system field index listing 268 with each listing including unique index references assigned to a respective system class, system method, and system field.

Condensed incremental application file 254 is condensed according to method 200 of the present invention (FIG. 5) and includes application index listing 280 and condensed code 282. Application index listing 280 includes application class index listing 292, method index listing 294, and field index listing 295. Method index listing 294 includes a listing of both internal and external methods, which are not distinguished as internal or external by the index reference but only by the configuration of their unique identifier, as previously discussed. Field index listing 295 includes a listing of both internal and external fields, which are not distinguished as internal or external by the index reference but only by the configuration of their unique identifier, as previously discussed.

Condensed code 282 provides an example of a portion of condensed application code. Condensed application code 282 includes an index reference 101 for application class money, which is contained in application class index listing 292. Condensed application code 282 includes an internal index reference 4 for external method algebra, which is listed both in application method index listing 294 of application file 254 and in system method index listing 266 of base file 252. Condensed application code 282 includes internal index reference 6 for internal method profit, which is listed only in application method index listing 294 of application file 254. Condensed application code 282 includes external index reference 99 for system class omega, which is listed in system class index listing 264 of base file 252.

When condensed code 282 is executed, and each index reference is encountered during running of condensed code 282, control of the code is directed to a respective index listing (e.g. base index listing 260 and/or application index listing 280) in which the index reference is located in order to call the respective class, method, and/or field corresponding to that unique index reference in the condensed code. As illustrated, acting on index references in condensed code 282 would send control of the condensed application code 282 to system class index listing 264 for system classes (e.g. index reference 99 in condensed code 282) and to method index listing 294 for system methods (e.g., index reference 4 in condensed code 282). The identifier for system method algebra then points further to system method index listing 266 of base file 252.

In addition, acting on index references in condensed code 282 would send control of program to application class index listing 292 for application classes (e.g., index reference 101 in condensed code) and to method index listing 294 for external and/or internal methods (e.g., index references 4 and 6 in condensed code 282).

In short, execution of condensed incremental application file 254 results in calling upon condensed base file 252 to access system classes (directly through external index references) and system methods and fields (indirectly through internal index references and identifiers) needed to run condensed incremental application file 254. While this relationship makes condensed incremental application file 254 dependent on condensed base file 252, each condensed incremental application file 254 that exists on a target device for use in a virtual machine is considerably smaller than non-condensed and conventionally condensed application files. Even with the considerably large condensed base file of system classes, methods, and fields, an overall memory savings for the target device occurs as the number of condensed incremental application file increases since each incremental application file essentially omits any system classes, methods, and fields. This arrangement prevents extensive duplicity of system classes, methods, and fields throughout a plurality of application files.

Figure 7:
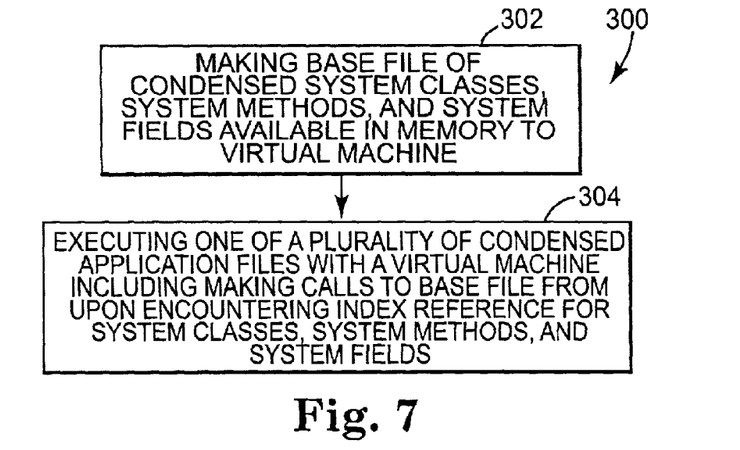
FIG. 7 is a flow diagram of a method of executing a plurality of condensed incremental application files with a condensed base file, according to an embodiment of the present invention.

Method 300 of the present invention of executing a plurality of condensed incremental application files is shown in FIG. 7. Method 300 includes a first step 302 of making a base file of condensed system classes, methods, and fields available in memory to a virtual machine, such as a Chai or MicroChai virtual machine. Step 304 includes executing one of a plurality of condensed incremental application files, sequentially, by making calls directly to the base file upon encountering an external index reference for a system class and/or indirectly to the base file upon encountering an internal index reference of the condensed application file for a system method or system field (i.e., external methods and fields).

Figure 8:
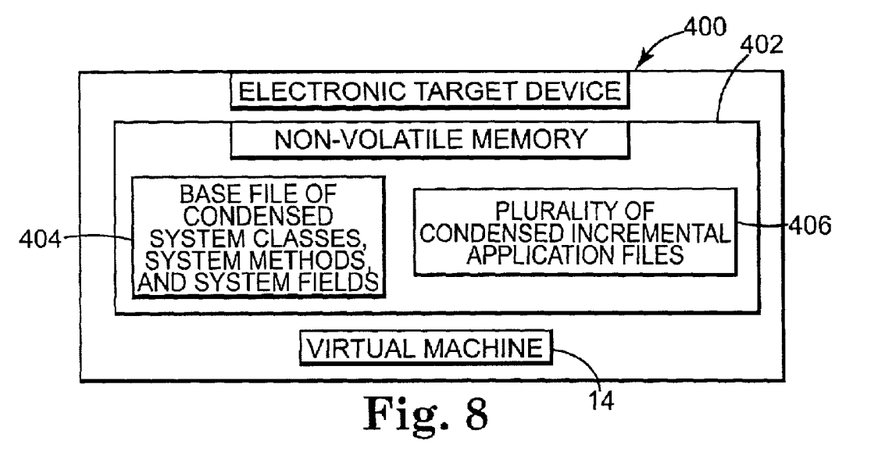
FIG. 8 is block diagram of a condensed base file of system classes and a condensed application file installed on an electronic target device, according to an embodiment of the present invention.

FIG. 8 illustrates an electronic target device 400 available for receiving installation of a condensed base file 404 of system classes, system methods, and system fields and a plurality of condensed incremental application file 406. Both the condensed base file 404 and the condensed incremental application file(s) 406 are condensed in a manner described herein for condensed base file 252 and condensed incremental application file 254 and preferably stored in non-volatile memory 402 for availability to virtual machine 14. Electronic target device 400 is preferably a personal digital assistant, or any device that runs applications, such as embedded applications, firmware, software, etc., and optionally includes a wireless phone, two-way pager, set-top television programming box, printer, mult-function peripheral, etc. Non-volatile memory 402 preferably is a hard drive and also optionally includes removable storage media such as an optical disc, a floppy disc, and/or a FLASH memory chip or card. Non-volatile memory is not limited to any particular form and can be any non-volatile data storage device now know or later developed.

In use, one of the plurality of condensed incremental application files 406 is executed by virtual machine 14, along with condensed base file 404. Condensed incremental application files 406 and condensed base file 404 are provided to virtual machine in a pre-concentrated state, i.e. already having been condensed before being loaded into virtual machine 14.

Figure 9:
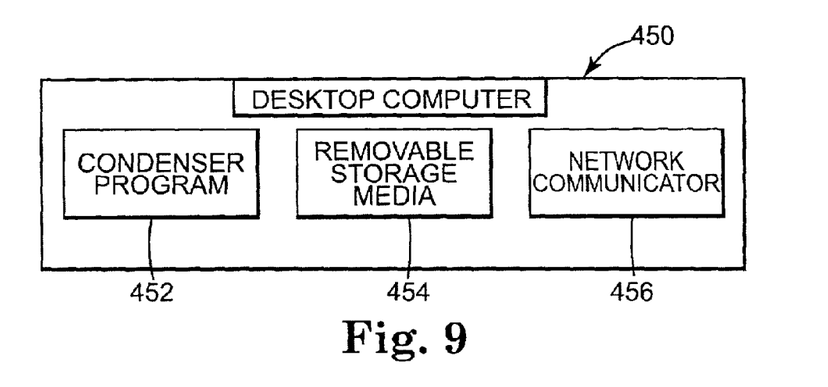
FIG. 9 is block diagram of a desktop computer for condensing an application file, according to an embodiment of the present invention.

FIG. 9 includes a desktop computer 450 for condensing an application file and/or a base file of system classes, methods and fields. Desktop computer 450 preferably comprises data processing system including commonly known elements such as a controller, memory, user interface, etc. Desktop computer 450 preferably includes condenser program 452, removable storage media 454, and network communicator 456. Condenser program 452 is configured to create a condensed base file of system classes, methods, and fields, and for condensing the application code into a condensed incremental application file, according to the method and systems of the present invention. A condensed base file and/or a condensed incremental application file are transferred to a target device for storage and/or execution by a virtual machine by the use of removable storage media or network communicator 456, which performs, wired and/or wireless network transmissions of the files via internet, intranet, local area network, wide area network, etc.

Alternatively, condenser program 452 optionally operates on a computing device, including a person digital assistant like target device 400 of FIG. 8.

With the system and method of the present invention for condensing application software code, a memory footprint, startup time, and transmission time for loading and executing a software application on a mobile computing device or target device is reduced. The method condenses an application software code into an incremental application file that, directly or indirectly, invokes system classes, system methods, and system fields from a condensed base file of a system library. This arrangement essentially eliminates the memory space formerly taken by each portion of the application code that previously specified the system class, system method, and/or system field.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of condensing an executable computer code for execution on a virtual machine, the method comprising:
   condensing, in a data processing environment external of the virtual machine, a first computer code including a plurality of system classes into a base file of condensed system classes; and
   condensing an application file, in a data processing environment external of the virtual machine, including replacing each occurrence of one of the system classes in the application file with an external index reference to a respective system class in the condensed base file.

2. The method of claim 1 wherein condensing the first computer code comprises:
   condensing the first computer code, including a plurality of system methods and system fields, into the base file including a condensed system methods and system fields; and
   wherein condensing the application file comprises:
   condensing a plurality of application classes, a plurality of application methods, a plurality of application fields, a plurality of system methods, and a plurality of system fields in the application file to produce an internal index listing in the application file that includes an internal index reference and a corresponding identifier for each one of the respective application classes, application methods, application fields, system methods, and system fields.

3. The method of claim 2 wherein condensing the application file comprises:
   replacing each occurrence of one of the system methods, system fields, application classes, application methods, and application fields in the application file with the internal index reference for a respective system method, respective system field, respective application class, respective application method, and respective application field.

4. The method of claim 3 wherein condensing the application file comprises:
   configuring the identifier of each system method and each system field to point to the base file for invoking the respective system method and the respective system field when the internal index reference for one of the respective system methods and system fields is called during execution of the condensed application file.

5. The method of claim 4 wherein condensing the application file comprises:
   configuring the identifier of each application class, application method, and application field to point to the application file for invoking the respective application class, respective application method, and respective application field when the internal index reference for one of the respective application classes, application methods, and application fields is called during execution of the condensed application file.

6. The method of claim 1 and further comprising:
   storing the condensed base file and the condensed application file in non-volatile storage media.

7. The method of claim 1 and further comprising:
   storing the condensed base file and a plurality of condensed application files in a non-volatile memory of an electronic device external to a virtual machine of the electronic device.

8. A method of condensing an executable application computer code, the method comprising:
   providing a condensed base file of a plurality of system classes, system methods, and system fields including an index reference for each respective system class, respective system method, and respective system field; and
   condensing the application computer code, to produce a condensed application file, including replacing each occurrence of one of the system classes in the application code with the respective index reference for the respective system class, and replacing each occurrence of one of the system methods and of one of the system fields in the application computer code with an internal index reference for each respective system method and system field.

9. The method of claim 8 wherein condensing the application computer code comprises:
   building an index listing including identifying each respective system method and system field and assigning an unique identifier to the respective index reference for the respective system method and system field; and
   configuring each of the identifiers, so that when one of the index references for one of the system methods and one of the system fields is called during execution of the condensed application file, the respective identifier points to the condensed base file, and so that when one of the index references for one of the application classes, one of the application methods, and one of the application fields is called during execution of the condensed application file, the respective identifier points to the condensed application file.

10. The method of claim 8 and further comprising:

performing the condensing of the application computer code external of a virtual machine; and storing the condensed base file and condensed application file in non-volatile memory external of the virtual machine in an electronic device.

11. A condensing program, stored on a computer-readable medium, having computer-executable instructions for performing a method of condensing an application software code, the method comprising:

providing a condensed plurality of system classes in a base file with a system class index listing including a system class index reference for each unique system class in the plurality of system classes; and condensing the application code, to produce a condensed application file, including replacing each occurrence of one of the system classes in the application code with an index reference of the base file for the corresponding system class.

12. The condensing program of claim 11 wherein providing the base file comprises:

providing a condensed plurality of system methods associated with the system classes including a method index listing in the condensed base file including an method index reference for each respective system method in the plurality of system methods; and providing a condensed plurality of system fields associated with the system classes including a field index listing including a field index reference for each respective system field in the plurality of system fields.

13. The program of claim 12 wherein condensing the application code comprises:

distinguishing between system methods and non-system methods of the application code, and between system fields and non-system fields of the application code;

building an index listing within the condensed application file including an index reference, and an identifier, for each one of the system methods, non-system methods, system fields, and non-system fields; and configuring each of the identifiers, so that when one of the index references for one of the system methods and one of the system fields is called during execution of the condensed application file, the respective identifier points to the condensed base file, and so that when one of the index references for one of the application classes, one of the application methods, and one of the application fields is called during execution of the condensed application file, the respective identifier points to the condensed application file.

14. The program of claim 11 wherein providing the base file comprises:

condensing a computer code including a plurality of system classes of a programming language into a condensed base file, including scanning the computer code, listing each system class identifier, and replacing each of the system class identifiers with an index reference corresponding to each respective identifier, and storing the condensed computer code of system classes in the base file.

15. The program of claim 11 and further comprising:

applying the condensing program to the plurality of system classes and to the application computer code external of a virtual machine; and configuring the condensed base file and the condensed application file for execution on the virtual machine; and storing the condensed base file and the condensed application file in non-volatile memory external of the virtual machine.

16. An electronic device comprising:

a virtual machine; and a non-volatile memory storing a condensed base file of a plurality of system classes, system methods, and system fields and storing a plurality of condensed incremental application files.

17. A data processing storage medium including machine readable code thereon for use in a computer system having a memory for storing executable computer code, the storage medium comprising:

means for creating a condensed base file from a plurality of system classes, with the condensed system classes defined by a first indexed list of the identifiers for the system classes and the first indexed list including a plurality of index references, with each of the identifiers in the first indexed list corresponding to at least one of the index references in the first indexed list;

means for condensing an application computer code into the condensed incremental application file, including means for scanning the application code and replacing each occurrence in the application code of the identifiers listed in the first indexed list with the respective external index reference in the first indexed list of the base file corresponding to the respective identifier.

18. A condensed executable computer code stored on a data storage medium comprising:

a condensed base file of a plurality of system classes with a system class index listing including an identifier for each unique system class and an index reference for each unique system class in the plurality of system classes; and a condensed application file excluding the system classes and including the external index reference for a respective system class with the identifier and configured to invoke the respective system class of the condensed base file.

19. The code of claim 18 wherein the condensed base file further comprises a plurality of system methods with a system method index listing including a system method index reference for each system method in the plurality of system methods, and comprises a plurality of system fields with a system field index listing including a system field index reference6 for each system field in the plurality of system fields, and wherein the condensed application file excludes system methods and system fields from the condensed application file and includes an internal index reference in place of the excluded system method and system fields with the index reference configured to invoke the respective system method and system field of the condensed base file.

* * * * *